United States Patent
Nair et al.

(10) Patent No.: US 12,455,309 B2
(45) Date of Patent: Oct. 28, 2025

(54) TEST APPARATUS AND METHOD FOR A MULTI-ELEMENT ANTENNA ARRAY

(71) Applicant: Cambium Networks Ltd, Ashburton (GB)

(72) Inventors: Deepu Vasudevan Nair, Karnatake (IN); Anoop K K, Karnatake (IN); Somashekhar M, Karnatake (IN); Varuna Hegde, Karnatake (IN)

(73) Assignee: Cambium Networks Ltd, Ashburton (GB)

( * ) Notice: Subject to any disclaimer, the term of this patent is extended or adjusted under 35 U.S.C. 154(b) by 132 days.

(21) Appl. No.: 18/510,262

(22) Filed: Nov. 15, 2023

(65) Prior Publication Data
US 2024/0393381 A1  Nov. 28, 2024

(30) Foreign Application Priority Data
May 26, 2023 (IN) .............................. 202341036487

(51) Int. Cl.
*G01R 29/10* (2006.01)
*G01R 29/08* (2006.01)

(52) U.S. Cl.
CPC .......... *G01R 29/10* (2013.01); *G01R 29/0892* (2013.01)

(58) Field of Classification Search
CPC .............................. G01R 29/10; G01R 29/0892
See application file for complete search history.

(56) References Cited

U.S. PATENT DOCUMENTS

| | | | |
|---|---|---|---|
| 7,876,276 B1 * | 1/2011 | Zaman | H01Q 3/08 343/703 |
| 2003/0038746 A1 * | 2/2003 | Patel | H01Q 3/267 342/368 |
| 2007/0285322 A1 | 12/2007 | Nyshadham et al. | |

(Continued)

FOREIGN PATENT DOCUMENTS

| CN | 103926474 A | 7/2014 |
|---|---|---|
| CN | 105548729 B | 7/2019 |

OTHER PUBLICATIONS

European Search Report for EP Application No. 24177807.5 dated Nov. 15, 2024 (7 pp.).

*Primary Examiner* — Eman A Alkafawi
*Assistant Examiner* — Suresh K Rajaputra
(74) *Attorney, Agent, or Firm* — Crowell & Moring LLP

(57) ABSTRACT

A far field radiation pattern is determined for a multi-element antenna array comprising a plurality of antenna elements in a first plane using test apparatus comprising a support member for holding the array and a movable probe having an aperture configured to move in a second plane parallel to the first. A distance between the first and second plane is less than a quarter of a wavelength at an operating frequency of the antenna array. The movable probe radiates electromagnetic energy from the aperture and is moved in a determined trajectory in the second plane. A respective measurement of amplitude and phase of electromagnetic energy received by the antenna array is taken at a plurality of positions on the determined trajectory. The far field radiation pattern is determined from the respective measurements and from a pre-determined radiation pattern for at least one antenna element of the plurality of antenna elements.

20 Claims, 10 Drawing Sheets

(56) References Cited

U.S. PATENT DOCUMENTS

| | | | |
|---|---|---|---|
| 2011/0193566 A1* | 8/2011 | Nyshadham | H01Q 21/062 |
| | | | 324/637 |
| 2019/0115941 A1 | 4/2019 | Noda | |
| 2019/0128938 A1* | 5/2019 | Patton | G01R 29/10 |
| 2020/0213016 A1 | 7/2020 | Jing et al. | |
| 2024/0372633 A1* | 11/2024 | Deckert | G01R 29/10 |

* cited by examiner

| S8.1 | Causing a multi-element array comprising a plurality of antenna elements disposed in a first plane to receive electromagnetic energy from a movable probe |

| S8.2 | Moving the movable probe in a determined trajectory in a second plane parallel to the first plane, the distance between the first plane and the second plane being less than a quarter of a wavelength at an operating frequency of the multi-element antenna array |

| S8.3 | Taking a respective measurement of amplitude and phase of electromagnetic energy received by the multi-element array at each of a plurality of positions on the determined trajectory |

| S8.4 | Determining the far field radiation pattern from the respective measurements and from a pre-determined radiation pattern for at least one antenna element of the plurality of antenna elements |

Figure 8

| | |
|---|---|
| S11.1 | Causing a plurality of antenna elements disposed in a first plane in an multi-element array to radiate electromagnetic energy |
| S11.2 | Moving a movable probe in a determined trajectory in a second plane parallel to the first plane, the distance between the first plane and the second plane being less than a quarter of a wavelength at an operating frequency of the multi-element antenna array |
| S11.3 | Taking a respective measurement of amplitude and phase of electromagnetic energy received by the movable probe at each of a plurality of positions on the determined trajectory |
| S11.4 | Determining the far field radiation pattern from the respective measurements and from a pre-determined radiation pattern for at least one antenna element of the plurality of antenna elements |

Figure 11

TEST APPARATUS AND METHOD FOR A MULTI-ELEMENT ANTENNA ARRAY

CROSS-REFERENCE TO RELATED APPLICATION

This application claims priority to India patent application No. 202341036487 filed on May 26, 2023, the entirety of which is hereby fully incorporated by reference herein.

BACKGROUND OF THE INVENTION

Technical Field

The present invention relates generally to testing a multi-element antenna array and particularly, but not exclusively, to a test apparatus and method for determining a far field radiation pattern for a multi-element antenna array.

Background

Modern wireless communication networks are typically placed under great demands to provide high data capacity within the constraints of the allocated signal frequency spectrum. To achieve a high data capacity, it is beneficial to transmit and receive signals with a high signal to noise ratio. To improve signal to noise ratio, increasing use is made of multi-element antenna arrays to form radiation beams to transmit and/or receive signals that provide signal gain to the wanted signals and reject interfering signals, and/or to enable MIMO (multiple input, multiple output) transmission schemes.

Multi-element antenna arrays typically comprise a number of antenna elements, each of which is configured to transmit and/or receive electromagnetic energy at a respective amplitude and phase appropriate to form a radiation beam or beams. Some multi-element antenna arrays have antenna elements each of which is configured to radiate and/or receive at a pre-determined relative amplitude and phase, for example being connected to a transmitter and/or receiver by a feed network of signal tracks having appropriate relative path lengths to provide the required relative phase shifts. Increasingly, antenna elements may have individually controllable phase and/or amplitude, to provide configurable beams, and large numbers of antenna elements may be provided in an array, for example 256 or more elements.

Conventionally, a multi-element antenna array may be tested by measuring a radiation pattern in an anechoic chamber. For example, measurement apparatus may measure a radiation pattern of radiation received from the antenna multi-element antenna array by using a probe that is arranged to move in a hemisphere within the radiated field. Alternatively, the probe may be at a fixed position and the antenna may be rotated. In either case, if the anechoic chamber is sufficiently large, a measurement may be made of the far field pattern, which is the radiation pattern that characterises the radiation from the antenna in the area of coverage of the antenna. The distance from the antenna at which the far field pattern may be said to be established depends on various factors such as the size and shape of the antenna. If the anechoic chamber is smaller, a similar technique may be used, with a probe arranged to move in a hemisphere around the antenna, but the near field is measured. The near field typically has an angular field distribution that is dependent on the distance from the antenna. To establish the far field pattern from the near field pattern, a transformation is required which depends on the known distance from the antenna of a near field measurements. Conventionally, it is arranged that the near field measurements are taken as far as possible from the antenna within the constraints of the size of the anechoic chamber, since this improves the accuracy of the transformation from near to far field. For example, the near field may be measured at a distance of 5 wavelengths or more from the antenna, so that, at each measurement point, a contribution from each of the antenna elements would be included in the measurement. However, use of an anechoic chamber may be costly and inconvenient for testing of antennas in production.

It would be beneficial to provide a method and apparatus for testing a multi-element antenna array to determine a far field pattern without the use of an anechoic chamber.

SUMMARY

In accordance with a first aspect of the invention there is provided a method of determining a far field radiation pattern for a multi-element antenna array, the multi-element array comprising a plurality of antenna elements disposed in a first plane, the method comprising providing test apparatus comprising a support member for holding the multi-element array and a movable probe configured to be movable in a second plane parallel to the first plane, causing the movable probe to radiate electromagnetic energy, moving the movable probe in a determined trajectory in the second plane, taking a respective measurement of amplitude and phase of electromagnetic energy received by the multi-element antenna array at each of a plurality of positions on the determined trajectory, and determining the far field radiation pattern from the respective measurements and from a pre-determined radiation pattern for at least one antenna element of the plurality of antenna elements, wherein a distance between the first plane and the second plane is less than a quarter of a wavelength at an operating frequency of the multi-element antenna array.

This arrangement allows a far field radiation pattern to be determined by using compact test apparatus suitable for factory testing and without the use of an anechoic chamber. Configuring the apparatus such that the distance between the first plane and the second plane is less than a quarter of a wavelength at an operating frequency of the multi-element antenna array allows transmission of radiation to each antenna element in turn, while reducing the amount of radiation received from adjacent antenna elements. This allows an accurate computation of far field pattern using the pre-determined radiation pattern for at least one antenna element, and reduces the need to shield the multi-element antenna array from multipath radiation, avoiding the use of an anechoic chamber. Furthermore, by transmitting from the movable probe rather than from the multi-element antenna array, radiation into the surroundings of the test apparatus may be reduced. The far field radiation pattern determined by measurement of received radiation at the multi-element antenna array may represent a radiation pattern for both transmission from and reception by the multi-element antenna array.

In an example, the plurality of positions on the determined trajectory in the second plane correspond to positions of the plurality of antenna elements in the first plane.

This allows a specific measurement to be taken to characterise each antenna element.

In an example, the movable probe comprises an open waveguide.

This provides efficient coupling between the probe and each antenna element.

In an example, the open waveguide has a square cross-section. Each side of the square cross-section may be substantially half a wavelength at an operating frequency of the multi-element antenna array. Each of the plurality of antenna elements may be a patch antenna element. Each patch antenna element may be planar having a width of substantially half a wavelength at an operating frequency of the multi-element array.

This provides efficient coupling between the probe and an antenna element with which it is aligned and reduces coupling with antenna elements with which it is not aligned.

In examples, each patch antenna element may comprise a metallic layer, the metallic layer being disposed in the first plane. The metallic layer may be attached to a dielectric substrate, wherein the width of each patch antenna element is substantially half a wavelength in a dielectric material of the substrate at an operating frequency of the multi-element array.

In an example, the open waveguide is provided with two probes at orthogonal polarisations, and the respective measurements are in two polarisations.

This allows measurements of dual polar antenna elements, which may identify a fault in one or both of the polarisation signal paths.

In an example, the multi-element array is a two dimensional array and the trajectory is in two dimensions within the second plane. The trajectory may be a raster scan.

This provides an efficient method of scanning the array.

In an example, the method comprises comparing each measurement with a pre-determined measurement for the respective antenna element to identify a failed antenna element.

This allows for effective factory testing, to allow for identification and correction of a failed antenna element.

In an example, the method comprises taking each measurement for an antenna element at a plurality of setting of a phase shifter in the antenna array for the antenna element and comparing each measurement with a pre-determined measurement for the respective phase setting of the antenna element to identify a failed phase shifter.

This allows for effective factory testing, to allow for identification and correction of a failed phase shifter in an antenna element.

In accordance with a second aspect of the invention there is provided apparatus configured to determine a far field radiation pattern for a multi-element antenna array, the multi-element array comprising a plurality of antenna elements disposed in a first plane, the apparatus comprising a support member configured to hold the multi-element array, an actuator arrangement configured to move a movable probe, the movable probe having an aperture configured to be movable in relation to the support member in a second plane parallel to the first plane, a radio frequency generator configured to provide a radio frequency signal to the movable probe, a radio frequency test set configured to receive the radio frequency signal from an output of the multi-element antenna array. One or more processors are configured to cause the actuator arrangement to move the movable probe in a determined trajectory in the second plane, cause the radio frequency test set to take a respective measurement of amplitude and/or phase of the radio frequency signal received by the multi-element antenna array at each of a plurality of positions on the determined trajectory and determine the far field radiation pattern from the respective measurements and from a pre-determined radiation pattern for at least one antenna element of the plurality of antenna elements, wherein a distance between the first plane and the second plane is less than a quarter of a wavelength at an operating frequency of the multi-element antenna array.

In accordance with a third aspect of the invention, there is provided a method of determining a far field radiation pattern for a multi-element antenna array, the multi-element array comprising a plurality of antenna elements disposed in a first plane, the method comprising: providing test apparatus comprising a support member for holding the multi-element array and a movable probe having an aperture configured to be movable in a second plane parallel to the first plane; causing the plurality of antenna elements to radiate electromagnetic energy; moving the movable probe in a determined trajectory in the second plane; taking a respective measurement of amplitude and phase of electromagnetic energy received by the movable probe at each of a plurality of positions on the determined trajectory; and determining the far field radiation pattern from the respective measurements and from a pre-determined radiation pattern for at least one antenna element of the plurality of antenna elements, wherein a distance between the first plane and the second plane is less than a quarter of a wavelength at an operating frequency of the multi-element antenna array.

In accordance with a fourth aspect of the invention, there is provided apparatus configured to determine a far field radiation pattern for a multi-element antenna array, the multi-element array comprising a plurality of antenna elements disposed in a first plane, the apparatus comprising: a support member configured to hold the multi-element array; an actuator arrangement configured to move a movable probe, the movable probe having an aperture configured to be movable in relation to the support member in a second plane parallel to the first plane; a radio frequency generator configured to provide a radio frequency signal to an input of the multi-element antenna array; a radio frequency test set configured to receive the radio frequency signal from the movable probe; and one or more processors configured to: cause the actuator arrangement to move the movable probe in a determined trajectory in the second plane; cause the radio frequency test set to take a respective measurement of amplitude and/or phase of the radio frequency signal received by the movable probe at each of a plurality of positions on the determined trajectory; and determine the far field radiation pattern from the respective measurements and from a pre-determined radiation pattern for at least one antenna element of the plurality of antenna elements, wherein a distance between the first plane and the second plane is less than a quarter of a wavelength at an operating frequency of the multi-element antenna array.

Further features of the invention will be apparent from the following description of preferred embodiments of the invention, which are given by way of example only.

BRIEF DESCRIPTION OF THE DRAWINGS

FIG. 8 is a flow diagram of a method of determining a far field pattern in an example;

FIG. 11 is a flow diagram of a method of determining a far field pattern in an example in an arrangement in which the multi-element antenna array is arranged to transmit and the movable probe is arranged to receive;

DETAILED DESCRIPTION

By way of example, embodiments of the invention will now be described in the context of testing a multi-element antenna array for operation in frequency band in the region of 4-6 GHZ, but it will be understood that embodiments of the invention are not restricted to operation in this range, and antenna arrays designed to operate at higher or lower frequencies may also be tested using the claimed method and apparatus.

Figure 1:
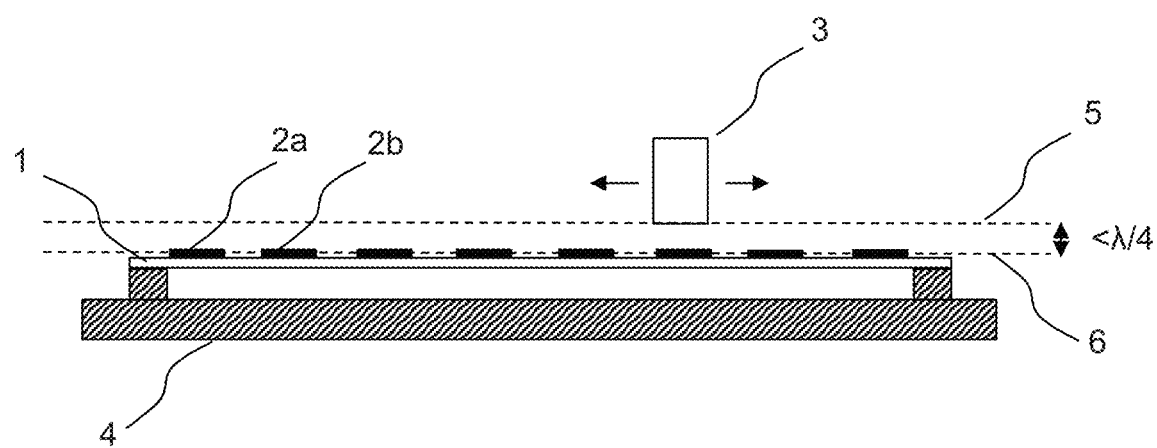
FIG. 1 is a schematic diagram showing apparatus for testing a multi-element antenna array, illustrating a plurality of antenna elements disposed in a first plane and a probe moveable in a second plane parallel to the first plane and separated form it by less than a quarter of a wavelength.

FIG. 1 shows illustrates test apparatus to be used in method of determining a far field radiation pattern for a multi-element antenna array 1, the multi-element array 1 comprising a plurality of antenna elements 2a, 2b disposed in a first plane 6. The antenna elements 2a, 2b may be patch antenna elements, which are substantially planar metallic patches. The patches may be formed as a copper layer deposited on a dielectric substrate, for example. The test apparatus comprises a support member 4 for holding the multi-element array 1 and a movable probe 3 configured to have an aperture for transmitting and/or receiving radiation that is movable in a second plane 5 parallel to the first plane 6. In a first example, the test is conducted by causing the movable probe to radiate electromagnetic energy. This may be done, for example, by connecting a signal source, such as the signal generator of a network analyser, to the movable probe. A receiver, such as the receiver of a network analyser may be connected to an output of a feed network within the assembly of the antenna array, that connects the electromagnetic energy received by each antenna element to the output of the feed network.

The movable probe 3 is moved in a determined trajectory in the second plane 5, and measurements are taken of amplitude and phase of electromagnetic energy received by multi-element antenna array at each of a plurality of positions on the determined trajectory. The measurements may be taken, for example, by the receiver section of the network analyser. The far field radiation pattern is determined from the respective measurements and from a pre-determined radiation pattern for at least one antenna element of the plurality of antenna elements.

The distance between the first plane 6 and the second plane 5 is less than a quarter of a wavelength at an operating frequency of the multi-element antenna array. Accordingly, the aperture at the end of the probe is maintained in close proximity to the plane in which the antenna elements are disposed. This short distance between the planes allows the probe to measure the radiation predominantly to a single element in each measurement, with contributions from other elements reduced. This allows the far field pattern to be accurately determined from the measurements, by using the pre-determined radiation pattern for each element and adjusting this by the measured relative amplitude and/or phase for each element. The far field pattern may be determined by vectorial combination of the field contributions from each element, given the known position of each element, the field contributions of each element being appropriately adjusted by a factor according to the measured amplitude and phase.

This approach has the advantage that, because the probe is coupled predominantly to a single element for each measurement, there is no need for an anechoic chamber, and the measurement equipment can be compact and use a simple planar, rather than hemispherical, scanner for the probe. Conventionally, a near field pattern is taken as far as possible from the antenna, so that each measurement intentionally includes contributions from multiple elements, and the near field pattern is then transformed to a far field pattern. The far field pattern is the pattern that is formed far enough from the antenna that the angular distribution of field does not change with distance.

In an example, as illustrated in FIG. 1, each patch antenna element 2a, 2b may comprise a metallic layer, the metallic layer being disposed in the first plane 6. The metallic layer may be attached to a dielectric substrate, the width of each patch antenna element 2a, 2b being substantially half a wavelength in a dielectric material of the substrate at an operating frequency of the multi-element array.

In an example, the movable probe comprises an open waveguide, which may have a square cross-section. Each side of the square cross-section may be substantially half a wavelength at an operating frequency of the multi-element antenna array. This provides improved coupling between the probe and an antenna element with which it is aligned and reduces coupling with antenna elements with which it is not aligned.

In an example, the positions on the determined trajectory in the second plane correspond to positions of the antenna elements in the first plane. This allows each measurement to accurately represent the radiation from a single element.

Figure 2:
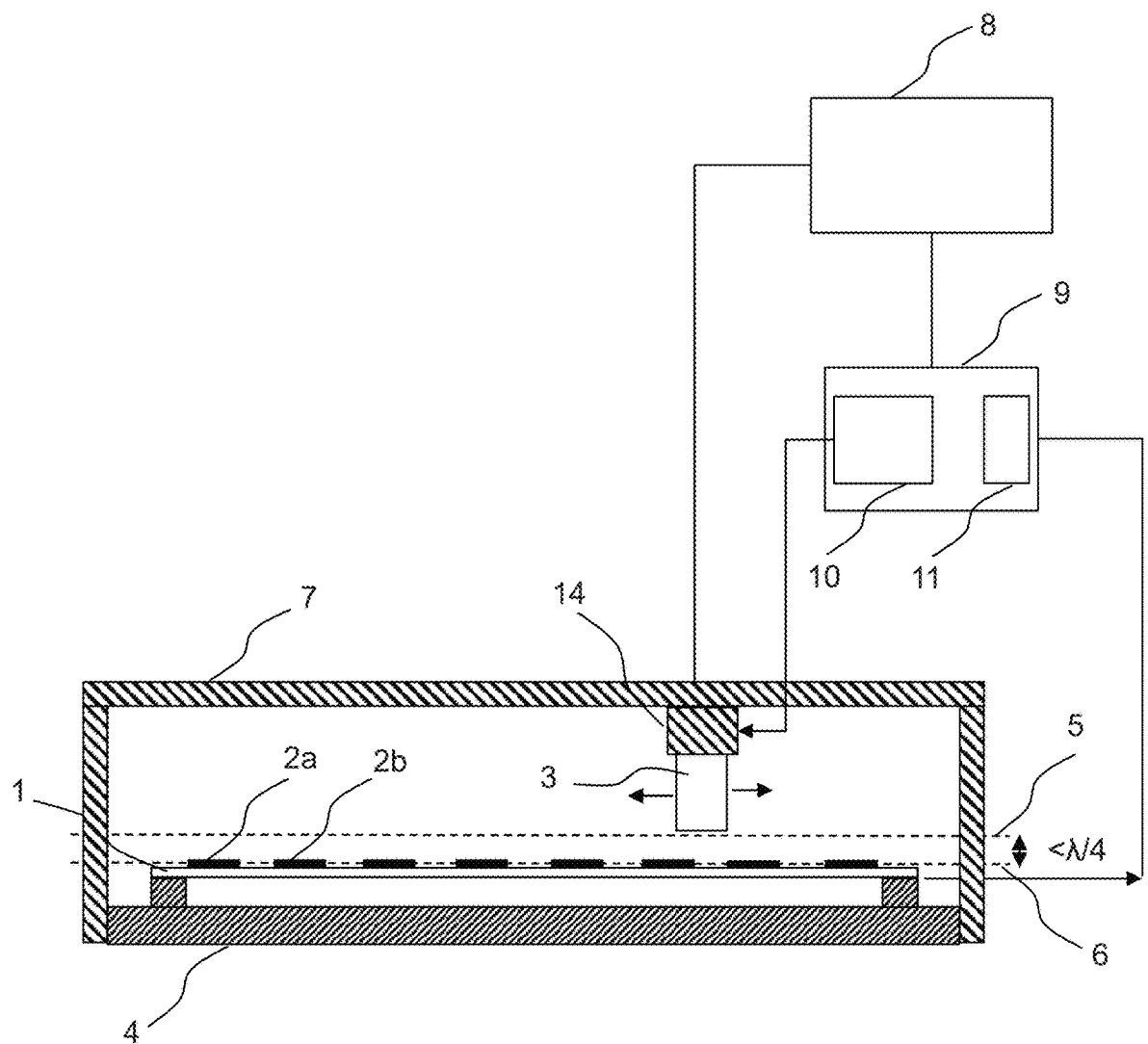
FIG. 2 is a schematic diagram showing apparatus for testing a multi-element antenna array, illustrating an actuator arrangement configured to move the probe, a radiofrequency transmitter and receiver, and one or more processors configured to control the test apparatus.

FIG. 2 shows the test comprising an actuator arrangement 7, 14 configured to move the probe 3, a radio frequency test set 9 comprising a radiofrequency generator 10 and a receiver 11, and one or more processors 6 configured to control the test apparatus. The actuator arrangement 7, 14 may comprise a frame 7, that can be controlled to move in one dimension, and a probe holder 14 that can be controlled to move along the frame 7 in a second dimension, orthogonal to the first dimension. The actuator arrangement 7, 14 and the support member 4 for the array may be adapted from a X-Y scanner.

The radio frequency test set 9 may be a network analyser, which may be configured to measure a transmission characteristic in amplitude and phase between the radiofrequency generator 10 and the receiver 11. The transmission characteristic may be expressed in terms of so-called scattering parameters, such as S21 which describe the complex signal transmission characteristics, for example in inphase and quadrature components.

In an example, for each measurement, the one or more processors 8 in the control processor, which may be, for example, a personal computer (PC), control the actuator arrangement to move the moveable probe 3 to a position corresponding to a selected antenna element by sending control signals to the actuator arrangement, which may be an X-Y scanner. The control processor may also send appropriate control signals to the radiofrequency test set 9 to cause it to conduct a measurement of the transmission characteristic in a determined frequency range for signal transmitted to the selected antenna element by the moveable probe. The control processor is arranged to store the measurement result in memory. When measurements have been taken and stored in memory for each antenna element, the one or more processors retrieve the measurements from memory, and use the measurements to appropriately shift the amplitude and/or phase of the pre-determined antenna element radiation model for each element. The relative spacing of the elements in the multi-element array and the shifted antenna radiation models can then be used to calculate the far field pattern in each required direction by superposition of the calculated radiation for each element in a given direction.

Figure 3:
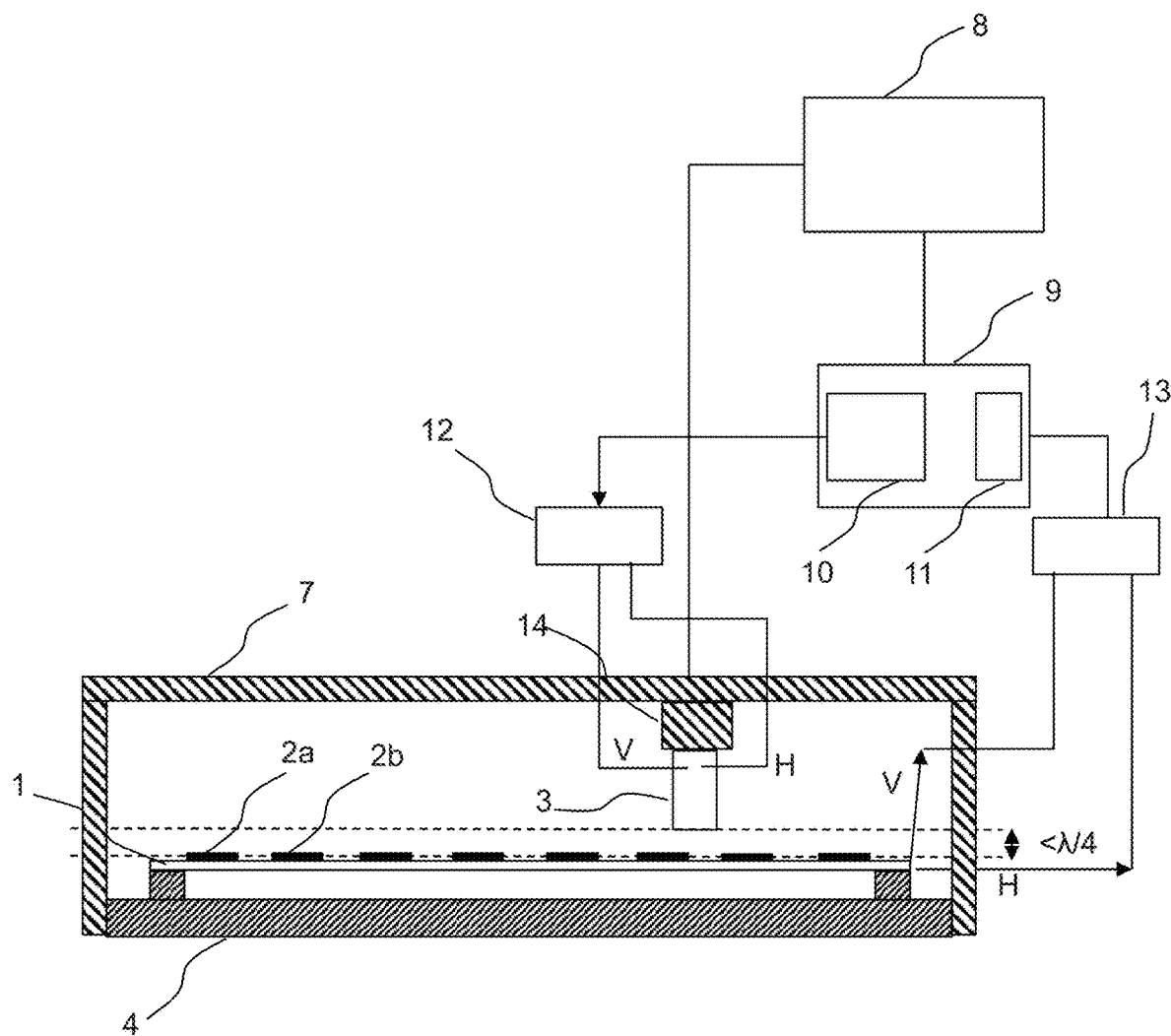
FIG. 3 is a schematic diagram showing apparatus for testing a dual polar multi-element antenna array.

FIG. 3 shows apparatus for testing a dual polar multi-element antenna array. A transmit switch 12 is provided to switch the signal generated by the signal generator 11 to either the V or H polarisation elements of the movable probe 3. A corresponding receive switch 13 is provided to switch between either a signal received by orthogonal V and H outputs of the multi-element antenna array, for connection to the receiver 11. The "V" polarisation is nominally vertical when the antenna array is installed for normal use, and the "H" polarisation is nominally horizontal, but the designations are arbitrary and the absolute orientation of the polarisations are not relevant during test.

Figure 4:
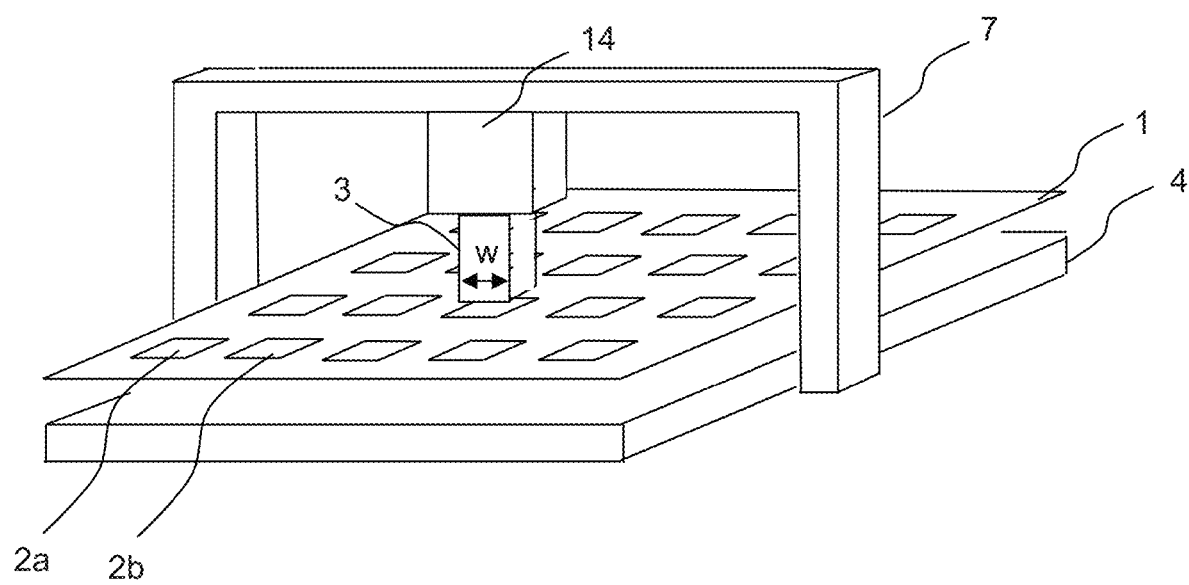
FIG. 4 is a schematic diagram showing an oblique view of apparatus for testing a multi-element antenna array.

FIG. 4 is a schematic diagram showing an oblique view of apparatus for testing a multi-element antenna array. This illustrates that the moveable probe 3 is arranged to move in two dimensions across the multi-element array 1 that is held in place on the support member 4. The frame 7 of the actuator arrangement is arranged to move in one dimension (front to back and vice versa in FIG. 4) and the probe holder 14 is arranged to move along the frame 7 in an orthogonal dimension (side to side in FIG. 4). The probe may be moved in a two dimensional trajectory, such as in a raster scan. Each measurement position may correspond to the position of an element 2a, 2b.

Each of the plurality of antenna elements 2a, 2b may be a patch antenna element. Each patch antenna element may be planar having a width of substantially half a wavelength at an operating frequency of the multi-element array. The movable probe 3 may be formed of square cross-section open waveguide as illustrated in FIG. 4. The waveguide may have parallel sides, the width w of a side being substantially half a wavelength at an operating frequency of the multi-element antenna array.

In an example, each measurement is compared with a pre-determined measurement for the respective antenna element to identify a failed antenna element. For example, pre-determined thresholds may be applied to determine a pass/fail condition for each antenna element. This is useful for production testing, because a failed element can be easily identified and corrected or replaced. By contrast, it would be difficult to identify which element had failed in a conventional testing arrangement of near or far field patterns.

In an example, each measurement for an antenna element may be taken at a number of setting of a phase shifter in the antenna array for the antenna element and each measurement may be compared with a pre-determined measurement for the respective phase setting of the antenna element. Thresholds may be applied to each measurement to identify a failed phase shifter. For example, a phase shifter may be configured to shift phase in steps of 60 degrees, or any other value. The test would determine that the intended phase shift, as applied by the one or more processors controlling the test apparatus and the multi-element array, was correct within the pre-determined tolerance.

Figure 5:
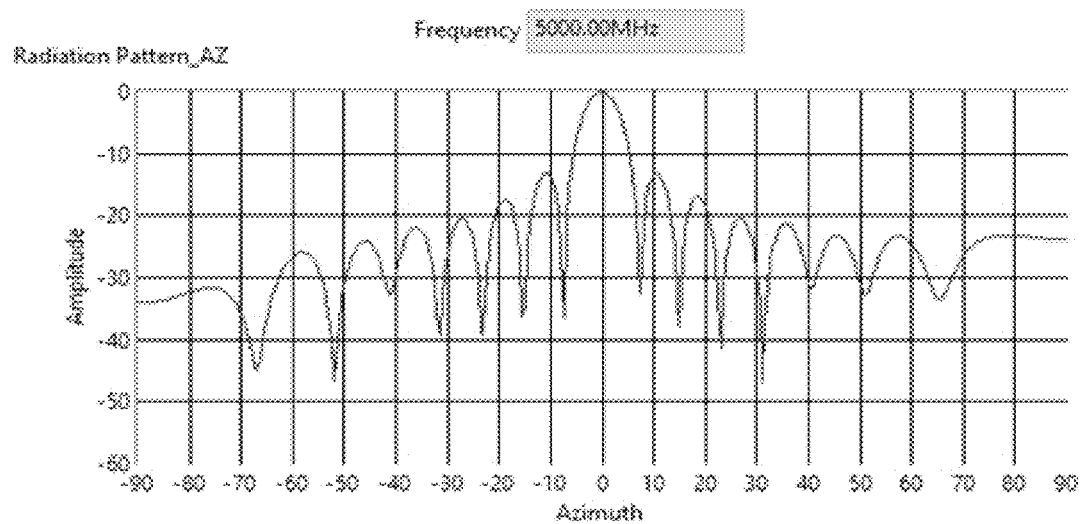
FIG. 5 shows an example of a far field pattern in azimuth determined in an example.
Figure 6:
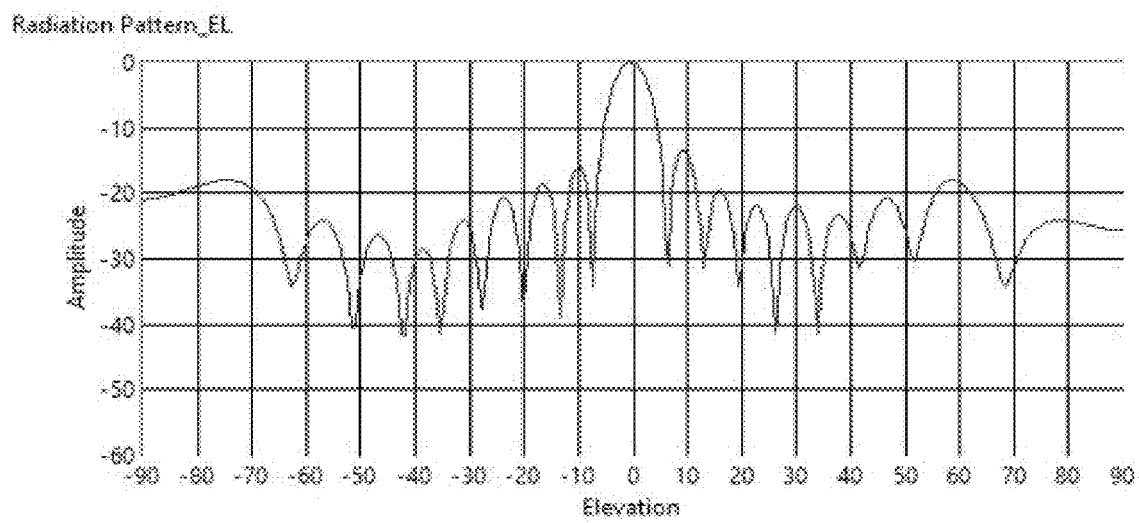
FIG. 6 shows an example of a far field pattern in elevation determined in an example.
Figure 7:
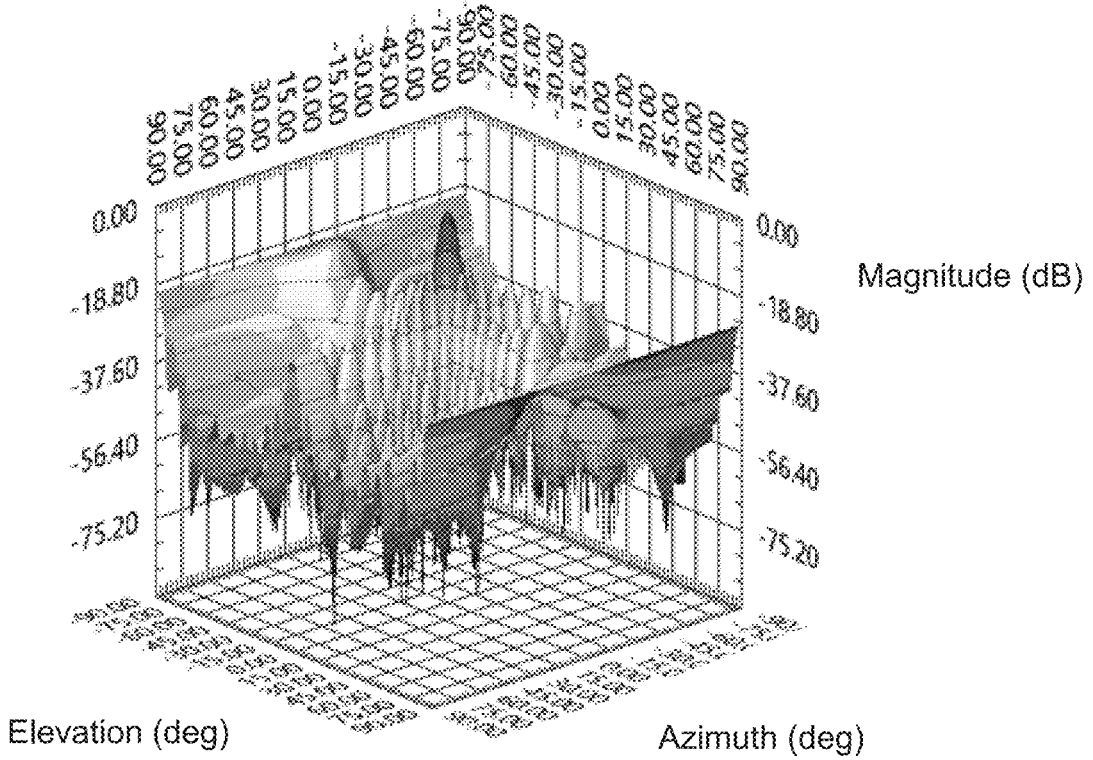
FIG. 7 shows an example of a far field pattern shown in azimuth and elevation determined in an example.

FIG. 5 shows an example of a far field pattern in azimuth, FIG. 6 shows an example of a far field pattern in elevation and FIG. 7 shows a three-dimensional plot of an example of a far field pattern shown in azimuth and elevation, determined as described herein.

FIG. 8 is a flow diagram of a method of determining a far field pattern according to steps S8.1 to S8.4.

FIGS. 2, 3 illustrate apparatus and methods in which the movable probe is arranged to transmit radiation and the multi-element antenna array is arranged to receive radiation, according to the method of the flow chart of FIG. 8. This approach has the advantage of reducing radiation into the test environment, because the multi-element antenna array is not arranged to radiate. Radiation from the movable probe is coupled to an antenna element with which it is aligned and spurious radiation is reduced by the close coupling between the movable probe and the antenna element. The far field radiation pattern, which applies for both transmit and receive, can be calculated, as described, on the basis of the signals received by each of the antenna elements of the multi-element antenna, assuming reciprocity between transmit and receive.

Figure 9:
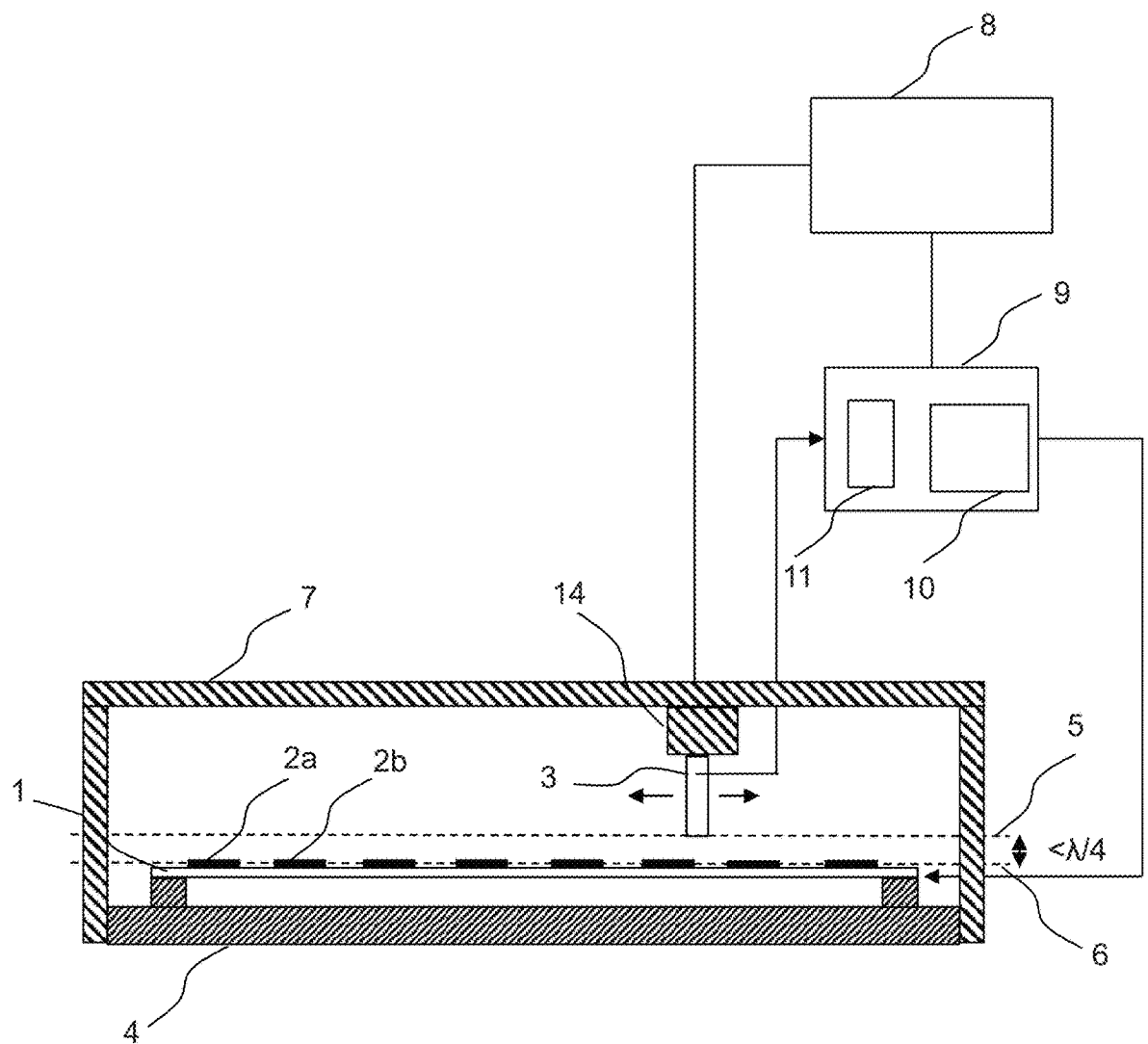
FIG. 9 is a schematic diagram showing apparatus for testing a multi-element antenna array, illustrating an actuator arrangement configured to move the probe, a radiofrequency transmitter and receiver, and one or more processors configured to control the test apparatus, in an arrangement in which the multi-element antenna array is arranged to transmit and the movable probe is arranged to receive.
Figure 10:
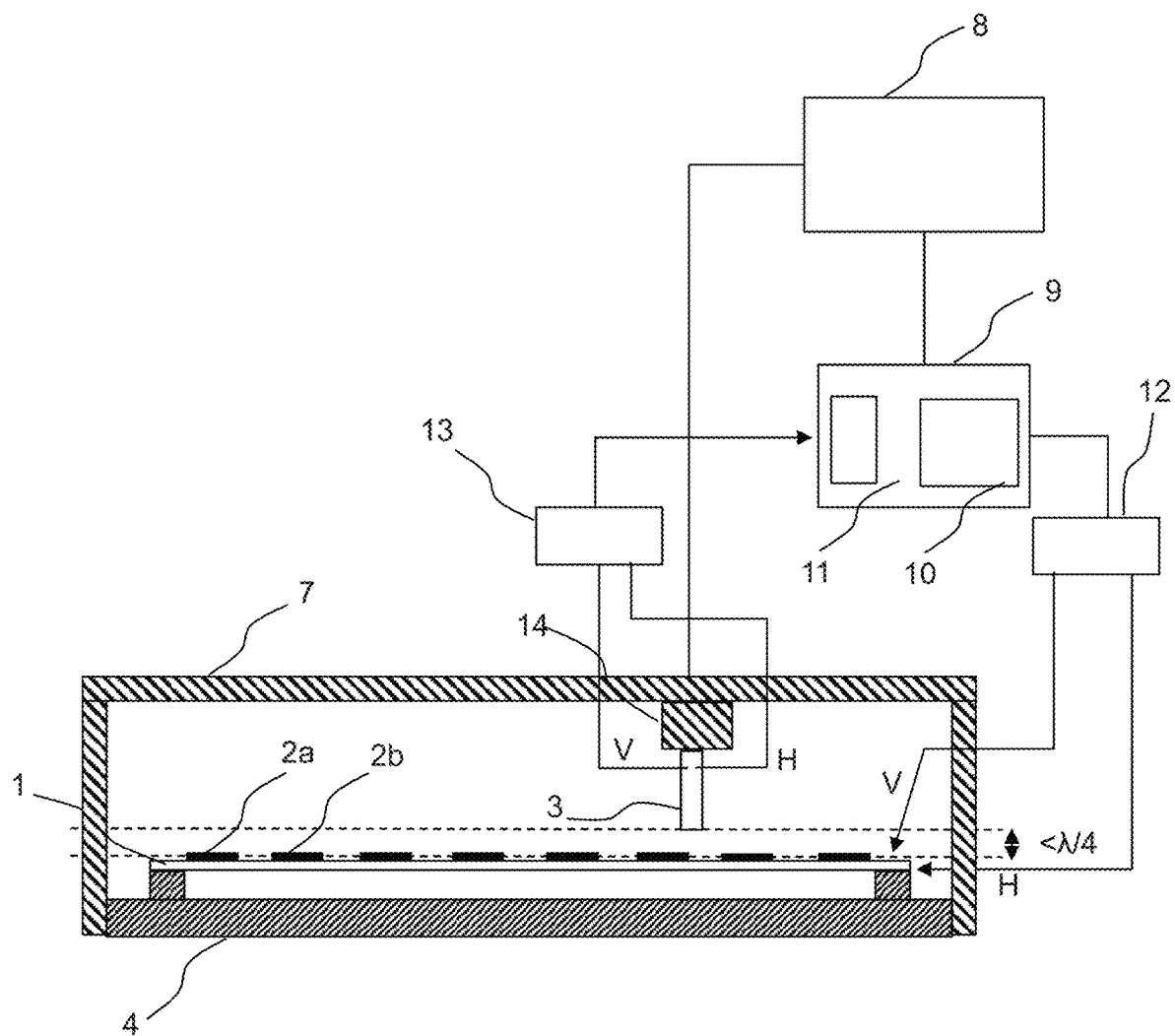
FIG. 10 is a schematic diagram showing apparatus for testing a dual polar multi-element antenna array, in an arrangement in which the multi-element antenna array is arranged to transmit and the movable probe is arranged to receive.

In an alternative arrangement, as illustrated by FIGS. 9 and 10 and the method shown by the flow chart of FIG. 11, the multi-element antenna can be used for transmit, and the movable probe can be used for receive. In this case, the far field radiation pattern can be calculated on the basis of the signals received at the movable probe from each of the antenna elements of the multi-element antenna. If reciprocity is assumed between transmit and receive, then again a far field pattern can be calculated for both transmit and receive.

As shown in FIG. 9, the multi-element antenna array is caused to radiate electromagnetic energy, for example, by connecting a signal source, such as the signal generator of a network analyser, to the input of a feed network, typically within the assembly of the antenna array, that connects the electromagnetic energy received at the input of the feed network to each antenna element in the multi-element antenna array. A receiver, such as the receiver of a network analyser may be connected to an output of the movable probe.

The movable probe 3 is moved, as for the alternative example illustrated by FIGS. 2 and 3, in a determined trajectory in the second plane 5, and measurements are taken of amplitude and phase of electromagnetic energy received from the multi-element array at each of a plurality of positions on the determined trajectory. The measurements may be taken, for example, by the receiver section of the network analyser. The far field radiation pattern is determined from the respective measurements and from a pre-determined radiation pattern for at least one antenna element of the plurality of antenna elements.

As shown in FIG. 10, a transmit switch 12 may be provided to switch the signal generated by the signal generator 11 to either the V or H polarisation inputs of the multi-element antenna array. A corresponding receive switch 13 is provided to switch between either a signal received by orthogonal V and H outputs of the movable probe, for connection to the receiver 11. The "V" polarisation is nominally vertical when the antenna array is installed for normal use, and the "H" polarisation is nominally horizontal, but the designations are arbitrary and the absolute orientation of the polarisations are not relevant during test.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of determining a far field radiation pattern for a multi-element antenna array, the multi-element array comprising a plurality of antenna elements disposed in a first plane, the method comprising:
   providing test apparatus comprising a support member for holding the multi-element array and a movable probe having an aperture configured to be movable in a second plane parallel to the first plane;
   causing the movable probe to radiate electromagnetic energy from the aperture;
   moving the movable probe in a determined trajectory in the second plane;
   taking a respective measurement of amplitude and phase of electromagnetic energy received by the multi-element antenna array at each of a plurality of positions on the determined trajectory; and
   determining the far field radiation pattern from the respective measurements and from a pre-determined radiation pattern for at least one antenna element of the plurality of antenna elements,
   wherein a distance between the first plane and the second plane is less than a quarter of a wavelength at an operating frequency of the multi-element antenna array.

2. The method of claim 1, wherein the plurality of positions on the determined trajectory in the second plane correspond to positions of the plurality of antenna elements in the first plane.

3. The method of claim 1, wherein the movable probe comprises an open waveguide having a square cross-section, wherein each side of the square cross-section is substantially half a wavelength at an operating frequency of the multi-element antenna array.

4. The method of claim 3, wherein each of the plurality of antenna elements is a patch antenna element, wherein each patch antenna element is planar having a width of substantially half a wavelength at an operating frequency of the multi-element array.

5. The method of any one of claim 3, wherein the open waveguide is provided with two probes at orthogonal polarisations, and the respective measurements are in two polarisations.

6. The method of claim 1, wherein the multi-element array is a two dimensional array and the trajectory is in two dimensions within the second plane.

7. The method of claim 6, wherein the trajectory is a raster scan.

8. The method of claim 1, comprising comparing each measurement with a pre-determined measurement for the respective antenna element to identify a failed antenna element, wherein the plurality of positions on the determined trajectory in the second plane correspond to positions of the plurality of antenna elements in the first plane.

9. The method of claim 1, comprising taking each measurement for an antenna element at a plurality of setting of a phase shifter in the antenna array for the antenna element and comparing each measurement with a pre-determined measurement for the respective phase setting of the antenna element to identify a failed phase shifter, wherein the plurality of positions on the determined trajectory in the second plane correspond to positions of the plurality of antenna elements in the first plane.

10. An apparatus configured to determine a far field radiation pattern for a multi-element antenna array, the multi-element array comprising a plurality of antenna elements disposed in a first plane, the apparatus comprising:
   a support member configured to hold the multi-element array;
   an actuator arrangement configured to move a movable probe, the movable probe configured to have an aperture movable in relation to the support member in a second plane parallel to the first plane;
   a radio frequency generator configured to provide a radio frequency signal to the movable probe for radiation from the aperture;
   a radio frequency test set configured to receive the radio frequency signal from an output of the multi-element antenna array; and
   one or more processors configured to:
      cause the actuator arrangement to move the movable probe in a determined trajectory in the second plane;
      cause the radio frequency test set to take a respective measurement of amplitude and/or phase of the radio frequency signal received by the multi-element antenna array at each of a plurality of positions of the movable probe on the determined trajectory; and
      determine the far field radiation pattern from the respective measurements and from a pre-determined radiation pattern for at least one antenna element of the plurality of antenna elements,
   wherein a distance between the first plane and the second plane is less than a quarter of a wavelength at an operating frequency of the multi-element antenna array.

11. The apparatus of claim 10, wherein the plurality of positions on the determined trajectory in the second plane correspond to positions of the plurality of antenna elements in the first plane.

12. The apparatus of claim 10, wherein the movable probe comprises an open waveguide.

13. The apparatus of claim 12, wherein the open waveguide has a square cross-section.

14. The apparatus of claim 13, wherein each side of the square cross-section is substantially half a wavelength at an operating frequency of the multi-element antenna array.

15. The apparatus of claim 14, wherein each of the plurality of antenna elements is a patch antenna element, wherein each patch antenna element is planar having a width of substantially half a wavelength at an operating frequency of the multi-element array.

16. The apparatus of claim 15, wherein each patch antenna element comprises a metallic layer, the metallic layer being disposed in the first plane.

17. The apparatus of claim 16, wherein the metallic layer is attached to a dielectric substrate, wherein the width of each patch antenna element is substantially half a wavelength in a dielectric material of the substrate at an operating frequency of the multi-element array.

18. The apparatus of claim 12, wherein the open waveguide is provided with two probes at orthogonal polarisations, and the respective measurements are in two polarisations.

19. A method of determining a far field radiation pattern for a multi-element antenna array, the multi-element array comprising a plurality of antenna elements disposed in a first plane, the method comprising:
providing test apparatus comprising a support member for holding the multi-element array and a movable probe having an aperture configured to be movable in a second plane parallel to the first plane;
causing the plurality of antenna elements to radiate electromagnetic energy;
moving the movable probe in a determined trajectory in the second plane;
taking a respective measurement of amplitude and phase of electromagnetic energy received by the movable probe at each of a plurality of positions on the determined trajectory; and
determining the far field radiation pattern from the respective measurements and from a pre-determined radiation pattern for at least one antenna element of the plurality of antenna elements,
wherein a distance between the first plane and the second plane is less than a quarter of a wavelength at an operating frequency of the multi-element antenna array.

20. An apparatus configured to determine a far field radiation pattern for a multi-element antenna array, the multi-element array comprising a plurality of antenna elements disposed in a first plane, the apparatus comprising:
a support member configured to hold the multi-element array;
an actuator arrangement configured to move a movable probe, the movable probe configured to have an aperture movable in relation to the support member in a second plane parallel to the first plane;
a radio frequency generator configured to provide a radio frequency signal to an input of the multi-element antenna array;
a radio frequency test set configured to receive the radio frequency signal from the movable probe; and
one or more processors configured to:
cause the actuator arrangement to move the movable probe in a determined trajectory in the second plane;
cause the radio frequency test set to take a respective measurement of amplitude and/or phase of the radio frequency signal received by the movable probe at each of a plurality of positions on the determined trajectory; and
determine the far field radiation pattern from the respective measurements and from a pre-determined radiation pattern for at least one antenna element of the plurality of antenna elements,
wherein a distance between the first plane and the second plane is less than a quarter of a wavelength at an operating frequency of the multi-element antenna array.

* * * * *